(No Model.)
E. S. MOORE.
STUMP EXTRACTOR.
No. 351,277. Patented Oct. 19, 1886.
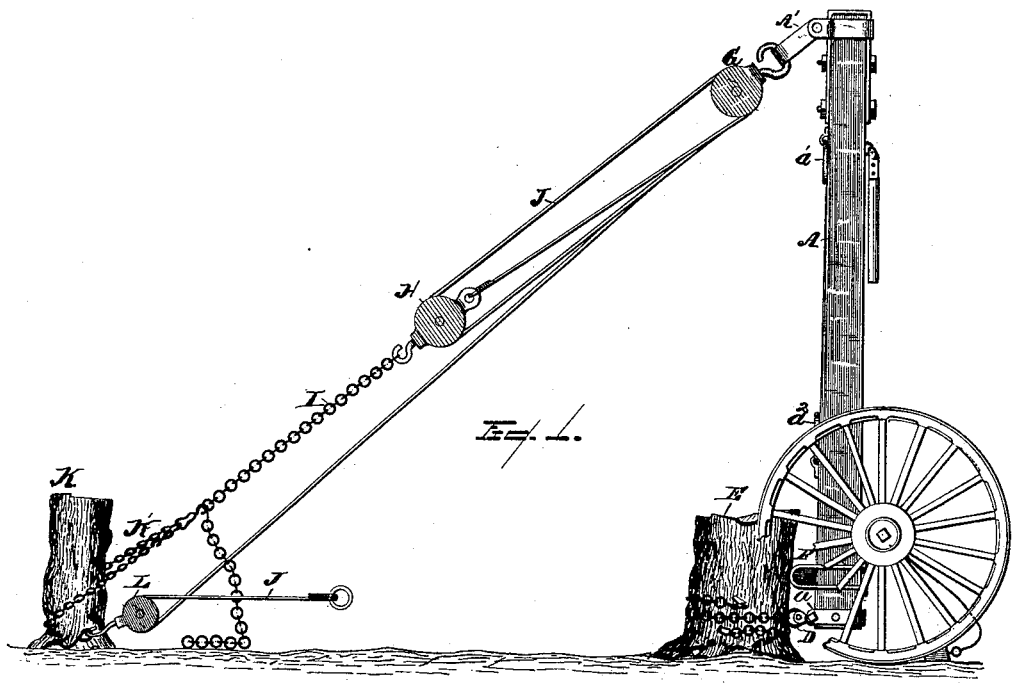
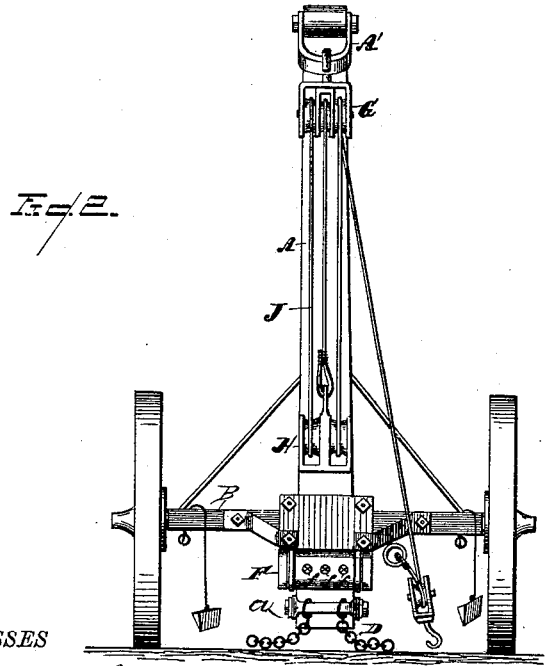
WITNESSES
Samuel E. Thomas
M. B. O'Dogherty
INVENTOR
Edwin S. Moore
By W. W. Leggett, Attorney

UNITED STATES PATENT OFFICE.

EDWIN S. MOORE, OF COLEMAN, MICHIGAN.

STUMP-EXTRACTOR.

SPECIFICATION forming part of Letters Patent No. 351,277, dated October 19, 1886.

Application filed April 30, 1886. Serial No. 200,679. (No model.)

*To all whom it may concern:*

Be it known that I, EDWIN S. MOORE, of Coleman, county of Midland, State of Michigan, have invented a new and useful Improvement in Stump-Pullers; and I do hereby declare the following to be a full, clear, and exact description of the invention, such as will enable others skilled in the art to which it pertains to make and use it, reference being had to the accompanying drawings, which form a part of this specification.

My invention relates to certain new and useful improvements in stump-machines, the object being to provide an improved device for pulling stumps, which shall be economical in construction and simple as well as efficient in its operation.

I carry out my design as more fully hereinafter specified, and more particularly pointed out in the claims.

In the drawings, Figure 1 is a side elevation embodying my invention, and Fig. 2 is a front elevation of the same.

A represents a lever of any suitable length and strength of material, engaged, preferably, upon an axle, B, provided with wheels C C, for the ready transportation of the device. The lever is so engaged that one of its ends extends a short distance below the axle when in a working position, and the other extends to a considerable distance above the axle, to give the amount of leverage-power desired. The lever is provided at its upper end with a clevis, A', and at its base with a clip or any other suitable device, $a$, by which a cable or chain, D, may be engaged therewith.

E represents a stump to be drawn, around which the chain D is secured and engaged with the base of the lever.

F represents a bait-block, which may be permanently secured upon the lever, and is preferably provided with teeth or points $f$, to engage in the stump and hold the lever in position.

G is a pulley-block, preferably a tripple pulley-block, although any desired number of pulleys may be employed therein, said block engaged when in use with the clevis A'.

H is an additional pulley-block, which may have a double pulley or any other multiple pulley engaged therewith, said latter being engaged with a draft-chain, I, and connected with pulley-block G by a cable, J, rove over the pulleys of the different blocks in the usual manner.

K represents an anchor-stump, around which an anchor-chain, K', may be fastened and engaged with the draft-chain I.

L is a draft-pulley, which may be fastened in any proper manner to any suitable object, the free end of the cable J being rove over the same and adapted for the engagement of the power therewith.

The clevis A' not only serves for the attachment of the block G, but for pulling the machine in transportation. When transported, it is evident the lever may be readily thrown down into a horizontal position, the tackle consisting of pulleys G H L, with their connecting chains and cables, being readily secured upon the lever by means of rings $a'$ $a^2$, to which the tackle may be fastened.

The operation of the device will now be understood. The machine having been transported into a field of stumps, an anchor-stump is selected, which may be a central one, and of small size. The machine is then located upon the opposite side of the stump to be pulled, the anchor-chain engaged with the anchor-stump, the lever erected in a vertical position, the block G engaged therewith, the block H united with the anchor-chain by the draft-chain and with the block G, the pulley L fastened, and the cable rove through it. The base of the lever is so located that the bait will bear against the stump. The wheels may be blocked, and the chain D engaged with the stump and lever. As the power is applied to the cable J, the stump will be tipped over. The teeth on the bait will be forced into the stump, and the wheels thereby raised from the ground, so that there will be no weight on the wheels or axle. In moving the machine the same anchor-stump may serve in several instances where the stumps are thick. By lowering one wheel into the ground with a pick or spade, so that the lever and pulley G will move past the same, the device may be used to pull over large trees. A very powerful purchase may thus be obtained by the combined leverage-power and pulleys.

What I claim as my invention is—

1. A stump-puller consisting of a lever engaged upon an axle, said lever extended at its base beyond said axle and provided with a bait above its base, and with a fastening device below said bait, and in combination therewith a tackle engaged with the upper end of said lever, substantially as described.

2. A stump-puller consisting of a lever mounted upon an axle, and having in combination therewith multiple pulleys G and H, provided with a draft-cable engaged with the upper end of said lever and rove through said pulleys, a draft-pulley, L, located upon the lower end of said cable, said lever having a bait engaged therewith above the base, and a fastening device located below said bait, substantially as described.

3. A stump-puller consisting of the combination, with a truck, of a lever engaged on the axle of said truck and provided with a bait located above the base of said lever, and a fastening device located below said bait, a reversible clevis located at the upper end of said lever, multiple pulleys provided with a draft-cable and engaged with said clevis, and cables to connect one of said pulleys to an anchor-stump, or its equivalent, all arranged to operate substantially as and in the manner described.

In testimony whereof I sign this specification in the presence of two witnesses.

EDWIN S. MOORE.

Witnesses:
AUGUSTUS SELIP,
EDWIN McCALL.